May 31, 1966 J. F. HAYDEN ETAL 3,253,503
PHOTOGRAPHIC COPYING APPARATUS
Filed April 2, 1962 7 Sheets-Sheet 1

Fig. 1

JAMES F. HAYDEN
GLEN W. OFFENSEND
INVENTORS

BY R. Frank Smith
Paul W. Holmes
ATTORNEYS

May 31, 1966  J. F. HAYDEN ETAL  3,253,503
PHOTOGRAPHIC COPYING APPARATUS
Filed April 2, 1962  7 Sheets-Sheet 2

JAMES F. HAYDEN
GLEN W. OFFENSEND
INVENTORS

BY R. Frank Smith
Paul P. Holmes
ATTORNEYS

Fig. 4

May 31, 1966 J. F. HAYDEN ETAL 3,253,503
PHOTOGRAPHIC COPYING APPARATUS
Filed April 2, 1962 7 Sheets-Sheet 6

Fig. 7

JAMES F. HAYDEN
GLEN W. OFFENSEND
INVENTORS

BY R. Frank Smith
Paul P. Holmes
ATTORNEYS

May 31, 1966  J. F. HAYDEN ETAL  3,253,503
PHOTOGRAPHIC COPYING APPARATUS
Filed April 2, 1962  7 Sheets-Sheet 7

Fig. 8

JAMES F. HAYDEN
GLEN W. OFFENSEND
INVENTORS

BY
ATTORNEYS 3,253,503
PHOTOGRAPHIC COPYING APPARATUS
James F. Hayden and Glen W. Offensend, Rochester, N.Y., assignors to Eastman Kodak Company, Rochester, N.Y., a corporation of New Jersey
Filed Apr. 2, 1962, Ser. No. 184,107
10 Claims. (Cl. 88—24)

This invention relates to a photographic apparatus and more particularly to an apparatus for the photographic copying of documents.

The novel features which comprise the present invention were originally devised for use in a photographic copying apparatus of the type which copies predetermined areas on documents which are fed successively through a photographing station. Such a known apparatus is disclosed in U.S. Patent 2,738,704, Hintz et al., granted March 20, 1956. It should be understood, however, that the invention which is disclosed and described herein could be used in other apparatus with equal facility and that its description with reference to the particular copying apparatus herein disclosed has been made only to provide background to facilitate the understanding of the invention.

While photographic copying apparatus of the type disclosed in U.S. Patent 2,738,704 is capable of copying documents at different optical magnifications, the changing from one to another magnification is a tedious job which requires considerable operator skill to provide correct optical alignment of the machine. Thus one aspect of the present invention is a device which simplifies the changing of the optical magnification of the optical system in such a photographic copying apparatus. Another aspect of the present invention is the provision of an improved mechanism for controlling the advance of the photographic recording media so that unexposed sections of recording media are positioned to receive the projected images of successive documents. Still another aspect of the present invention is the provision of a novel mechanism, operatively associated with the movement of the recording media, to adjust the size of the exposure aperture in the exposure station to conform to the extent of movement which is imparted to the recording media.

The primary object of the present invention is, therefor, to provide an improved photographic copying apparatus.

Another object of the present invention is to provide an improved optical projection system for a photographic copying apparatus.

Still another object of the present invention is to provide an improved optical projection system for a photographic copying apparatus which is capable of varying the size of the document image projected thereby while maintaining the projected image in focus on the photographic recording media located in the exposure station of the apparatus.

Yet another object of the present invention is to provide an improved mechanism for moving the photographic recording media in a photographic copying apparatus in synchronism with the movements of documents through the photographing station of the apparatus.

Still another object of the present invention is to provide an improved mechanism for advancing a photographic recording media intermittently and through a predetermined distance in synchronism with the movement of documents through the photographing station of a photographic copying apparatus.

Another object of the present invention is to provide, in a photographic copying apparatus for copying variable width areas on documents bearing means for designating the width of such areas, an improved mechanism for moving the photographic recording media in the exposure station of the apparatus in synchronism with the movement of documents through the photographing station of the apparatus, the extent of movement imparted to the recording media corresponding to the width of the area on the document being copied, and the mechanism including means for preselecting the ratio of such correspondence.

Still another object of the present invention is to provide a mechanism which is operatively associated with the film advance mechanism of a photographic copying apparatus, to adjust the size of the exposure aperture in accordance with the length of film which is advanced by the film advance mechanism.

Yet another object of the present invention is to provide, in a photographic copying apparatus for copying variable width areas on documents bearing means for designating the width of such areas, an improved film advancing mechanism for moving a length of film into the exposure station of the copying apparatus, which length corresponds to the width of the area on the document being copied, said mechanism being operatively associated with a mask for the exposure station and thereby changing the size of the exposure aperture of the exposure station to correspond to the length of film moved into the exposure station.

Still other objects and advantages of the present invention will become readily apparent to those skilled in the art from the following description with reference to the drawings in which like characters denote like parts and wherein:

Figure 1:
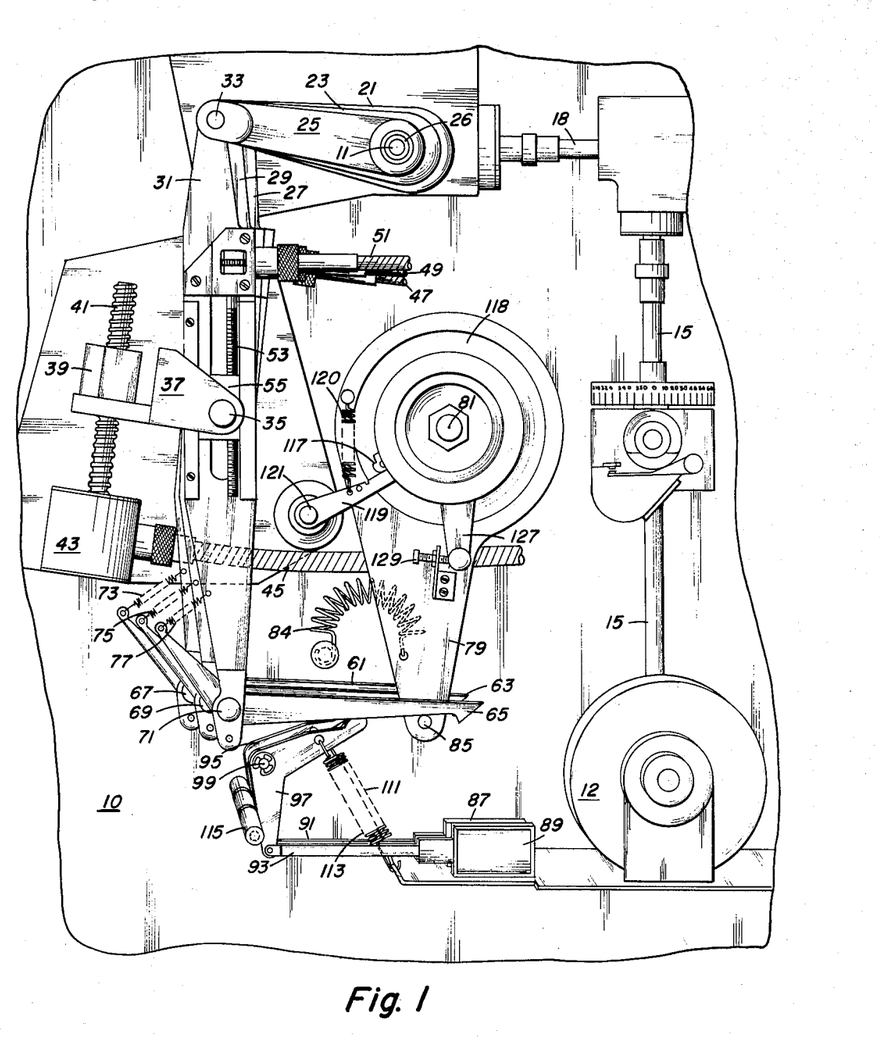
FIG. 1 is a side elevation view of a photographic copying apparatus showing the film advance mechanism of the present invention.
Figure 2:
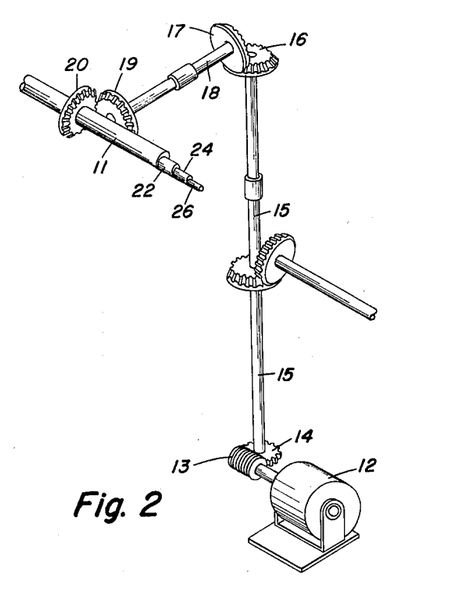
FIG. 2 is a schematic illustration of the drive for film advance mechanism.

The frame of the photographic copying apparatus is designated by the numeral 10. The numeral 11 designates a crank shaft which carries document advancing means for feeding the documents to be photographed through the photographing station of the document copying apparatus. The specific mechanism by which this feeding movement of documents is accomplished does not form a part of the present invention and can be any one of several which are well-known in the art such as, for example, the one disclosed in Hintz et al. U.S. Patent 2,738,704. Crank shaft 11 is driven by motor 12 through worm 13 and worm gear 14, shaft 15, level gears 16 and 17, shaft 18 and bevel gears 19 and 20, see FIG. 2. Crank shaft 11 carries three individual cranks 21, 23, and 25 on three bearing surfaces 22, 24, and 26, respectively, each surface being eccentric to the others and being eccentric to the rotational axis of crank shaft 11. As is apparent from FIG. 2, the throw of crank 23 is greater than that of 21, and the throw of crank 25 is greater than that of crank 23. The function of this construction will be hereinafter set forth. The cranks are pivotally connected to three similarly sized and shaped pawl arms 27, 29, and 31, respectively, by means of three similar connector pins, only one of which is shown at 33. The three pawl arms are pivotally mounted about pivot shaft 35. Pivot shaft 35 is supported on a pawl arm bracket 37 which, in turn, carries a nut 39 for receiving the pawl pivot adjustment screw 41. The screw 41 is carried by the pivot adjusting base 43 which is fixed on frame 10. Screw 41 is operatively connected to suitable gearing contained within base 43 and is rotatably driven by the gearing through flexible shaft 45 and an electric motor, not shown, which drives the flexible shaft. The same motor also drives the three flexible shafts designated 47, 49, and 51 which are associated, as will be hereinafter set forth, with pawl arms 27, 29, and 31, respectively. Each pawl arm includes a pivot adjusting screw such as the one in pawl arm 31 designated by the numeral 53. The pivot adjusting screws are threaded on a pivot adjusting slide like the one designated by the numeral 55 of pawl arm 31 and each slide is rotatably carried by pivot shaft 35. Each of the flexible shafts 47, 49, and 51 are connected by respective worms and worm gears to the pivot adjusting screws of pawl arms 27, 29, and 31 so that rotation of the flexible shafts is imparted to the pivot adjusting screws to thereby move the pivot adjusting slides either toward or away from the connector pins which connect the pawl arms to the cranks. In other words, the rotation of flexible shafts 47, 49, and 51 change the relative pivot point for the pawl arms 27, 29, and 31, respectively. The gears through which flexible shafts 47, 49, and 51 are driven are selected so the pivot adjusting slides are all displaced the same amount in response to any rotation imparted by the motor to such shafts.

As was mentioned, the flexible shaft 45 is driven by the same motor which drives flexible shafts 47, 49, and 51. The drive of shaft 45 is simultaneous with the driving of shafts 47, 49, and 51 and the relative speeds with which the four flexible shafts are driven is chosen through the gearing utilized so that the pawl arm bracket 37 will be moved in the same direction that the pivot adjustment slides are moved relative to the pawl arms and to an extent which is exactly equal to the distance traversed by the pivot adjusting slides relative to the pawl arms. Thus even though the pivot point for the pawl arms 27, 29, and 31 is changed the ends of the pawl arms remain in the exact same vertical position relative to frame 10.

Three similarly sized and shaped film advance pawls designated 61, 63, and 65 are pivotally mounted by three studs 67, 69, and 71, respectively, on the ends of the pawl arms remote from the cranks 21, 23, and 25. The operating ends of the pawls are urged in a clockwise direction about studs 67, 69, and 71 by means of tension springs 73, 75, and 77, respectively. The numeral 79 designates the film advance arm. This arm is mounted in the apparatus for pivotal movement about axis 81, which axis corresponds of the axis of rotation of the drive roller 83, see FIG. 4. Drive roller 83 positions the film strip F in the exposure station of the apparatus as will be hereinafter described. The film advance arm 79 is connected to drive roller 83 by means of a one-way clutch, not shown, so that angular rotation of the film advance arm in a clockwise direction with respect to axis 81 is imparted to the roller 83, thereby moving the film F through contact with the periphery of the roller while pivotal movement of the arm in a counterclockwise direction about axis 81 imparts no movement whatsoever to the roller 83. The one-way clutch is of a well-known construction and can be any one of several which are commercially available to the trade. The lower end of the film advance arm 79 carries a pawl pin 85 which is sufficiently long to engage and support the pawl arms 61, 63, and 65. Arm return spring 84 resiliently urges arm 79 in a counterclockwise direction about axis 81 and maintains pin 85 in engagement with the end of one of arms 61, 63, or 65.

Two pawl selector solenoids 87 and 89 are mounted on a bracket which is fixed relative to frame 10. The plungers 91 and 93 of the two solenoids 87 and 89, respectively, are pinned on the ends remote from the solenoids to two pawl selector arms 95 and 97, respectively. The pawl selector arms are mounted for rotation about a stud 99 which is fixed in frame 10 and are resiliently urged in a clockwise direction relative to the stud 99 by means of a pair of tension springs 111 and 113, respectively. A stop member 115 prevents rotation of pawl selector arms beyond a predetermined point. The end of the arm 95 which is remote from the plunger 91 is positioned to engage the under surface of film advance pawl 61 while the corresponding end of pawl selector arm 97 is disposed to engage the under surface of film advance pawl 63. The function served by the pawl selector solenoids and the associated arms 95 and 97 is to selectively raise either or both film advance pawls 61 and 63 so that they do not engage pawl pin 85.

The photographic copying apparatus, in conjunction with which the present invention is disclosed herein, includes means for sensing the width of the areas on the documents to be photographed. Such a sensing means, which does not form a part of the present invention, is disclosed in Hintz et al. U.S. Patent 2,794,364, granted June 4, 1957. The sensing means of the apparatus herein disclosed is operatively associated with pawl selector solenoids 87 and 89 so that pawl selector arms 95 and 97 function as follows:

When documents bearing designating means indicating a single width area to be photographed are sensed by the sensing means, neither solenoid is energized with the result that film advance pawl 61 limits the extent of the counterclockwise movement of arm 79 and after exposure of the area image on film F, draws arm 79 in a clockwise direction a distance which is sufficient to advance a length of film F through the exposure station which length is approximately equal to the exposed length of film.

When documents bearing designating means indicating a double width area to be photographed are sensed by the sensing means, solenoid 87 is energized and pawl 61 is raised from pawl pin 85. Pawl 63 then limits the extent of the counterclockwise movement of arm 79 and after exposure of the double width area image on the film F, pawl 63 draws arm 79 in a clockwise direction a distance which is sufficient to advance a length of film through the exposure station which length is approximately equal to the exposed length of film.

When documents bearing designating means indicating a triple width area to be photographed are sensed by the sensing means, solenoids 87 and 89 are both energized raising pawls 61 and 63 from pin 85. Pawl 65 then limits the extent of the counterclockwise movements of arm 79 and after exposure of the triple width area image on the film F, pawl 65 draws arm 79 in a clockwise direction a distance which is sufficient to advance a length of film through the exposure station, which length is appoximately equal to the exposed length of film.

From the above it will be apparent that the geometric arrangement of the cranks, pawl arms and film advance pawls is such that the extent of movement imparted to film F through arm 79 is dependent upon the film advance pawl which remains in engagement with pin 85. In addition, the extent of such movement as imparted by any given film advance pawl, is changed upon changing the pivot shaft (35) position relative to the pawl arms 27, 29, and 31.

It is to be understood that the novel concept embodied in the film advance mechanism of the present invention can be utilized in photographic apparatus other than the document copying apparatus described herein. For example, in an apparatus which is designed to copy a predetermined area only of successive documents only one crank, one pawl arm, and one pawl would be required. Furthermore, the extent of movement imparted to the film in such a case could be controlled by varying (1) the location on the pawl arm at which the pawl is connected, (2)

the location on the pawl arm at which the crank is connected, or (3) the location of the pivot axis of the pawl arm or (4) a combination of any of two or more of these locations on the pawl arm, rather than merely varying the location of the pivot axis as shown and particularly described herein. In other words, considering the pawl arm as a lever, the output displacement of such lever, which is used to control the extent of film movement, can be varied without changing the input displacement by changing either the location of the output displacement on the lever, the location of the input displacement imparted to the lever, the location of the fulcrum for the lever, or the location of any two or more of the input displacement, output displacement and fulcrum.

A small cam 117 is fixed on a circular plate 118 which is itself carried by the film advance arm 79. Aperture control arm 119 is maintained in contact with cam 117 by means of a tension spring 120 and is fixed on one end to a shaft 121. Shaft 121 also carries the movable element 123 of the mask, see FIG. 4, for the exposure station of the apparatus. The other element 125 of the mask is fixed in position in the apparatus. The position of cam 117 relative to arm 79 can be adjusted by locating the aperture plate adjusting arm 127 by the aperture adjusting screw 129, said arm 127 being fixed on plate 118. Thus the width of the mask is under the positive control of the film advancing mechanism. With the arrangement there can be no errors because of a synchronizing failure.

Figure 3:
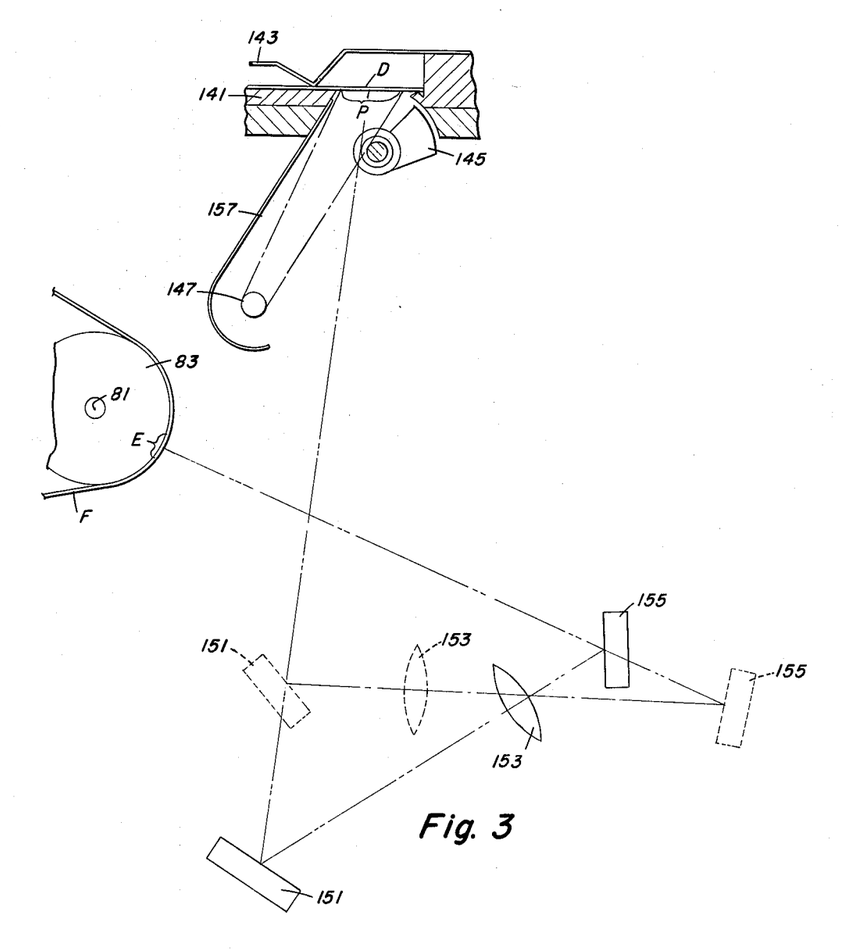
FIG. 3 is a schematic illustration of the optical system of the present invention.

Next, the optical system of the present invention, as it is incorporated in the photographic copying apparatus, will be described. Referring to FIG. 3, the film F is shown in contact with the periphery of the film drive roller 83 and the area of the film on which the image of document D is exposed, is designated by the letter E standing for exposure station. The area of document D which is to be recorded is located over an aperture P formed in the shelf 141, the character P standing for the photographing station. The numeral 143 designates a spring which is utilized to keep the document D flat on shelf 141 over aperture P. The card support roller 145 is rotated in synchronism with the movement of documents into the photographing station so as to support the leading edge of the document as it traverses the aperture in the shelf 141. Thus roller 145 prevents the cards from falling down into the aperture P. A lamp 147 is flashed in synchronism with the arrival of each document in the photographing station where the image of the predetermined area on each illuminated document is directed to the first mirror 151, from the first mirror through the projection lens 153 to the second mirror 155, and from the second mirror onto the unexposed area of the film F then in the exposure station E. The specific mechanism by which the lamp 147 is flashed and card support roller is rotated in synchronism with the movement of each document into the photographing station, is well known in the art and therefore will not be described in further detail herein. The shield and reflector 157 directs the light from flash lamp 147 onto the document D in aperture P in the well-known manner.

In order to photograph the area on the document D at any one of several possible magnifications, a novel system of coordinated mirror and lens movements has been devised. The optical system in the position shown by the solid lines in FIG. 3 projects an image of minimum size (for the system) to the exposure station E. When the optical elements are shifted to the positions designated by the dotted representations thereof in FIG. 3, the image projected by the system to the exposure station E has a maximum size. The image projected to the exposure station E is maintained in focus at all magnifications.

Figure 4:
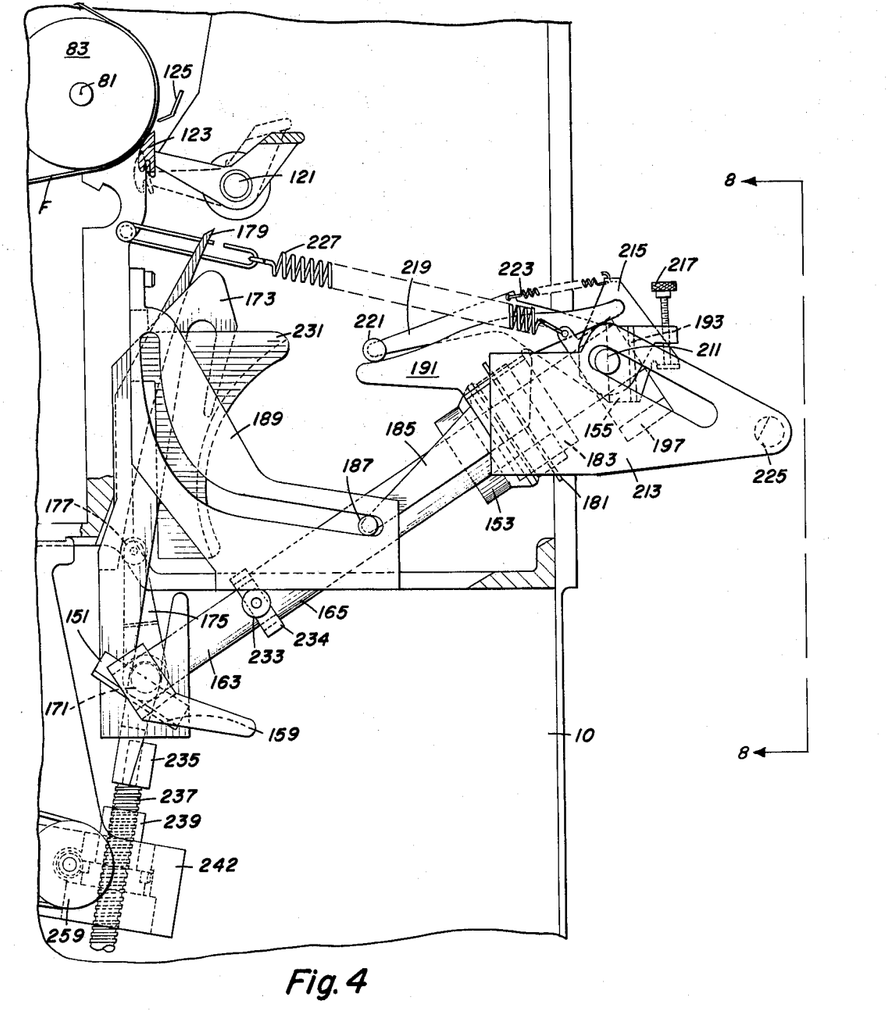
FIG. 4 is a side elevation view partly in section showing the optical system of the present invention as it is incorporated in the photographic copying apparatus.

In FIG. 4, the elements of the optical system, that is, first mirror 151 projection lens 153 and second mirror 155 are shown in positions corresponding to the solid line schematic representation of the same in FIG. 3. First mirror 151 is carried by mirror support 159 which, in turn, is pivotally mounted by means of a shaft 161 on the lower end of a telescoping lens carriage mechanism. The inner telescoping lens carriage shaft on the right within the apparatus is designated by the numeral 163 and the outer larger shaft within which shaft 163 telescopes is designated by the numeral 165. In order to facilitate the description of the apparatus, the structure on the left within the apparatus which corresponds to a similar named part on the right will be designated by the same numeral primed. Thus, for example, the telescoping lens carriage shaft on the left within the apparatus is designated by the numeral 163' and the larger shaft 165', see FIGS. 6 and 8.

Figure 6:
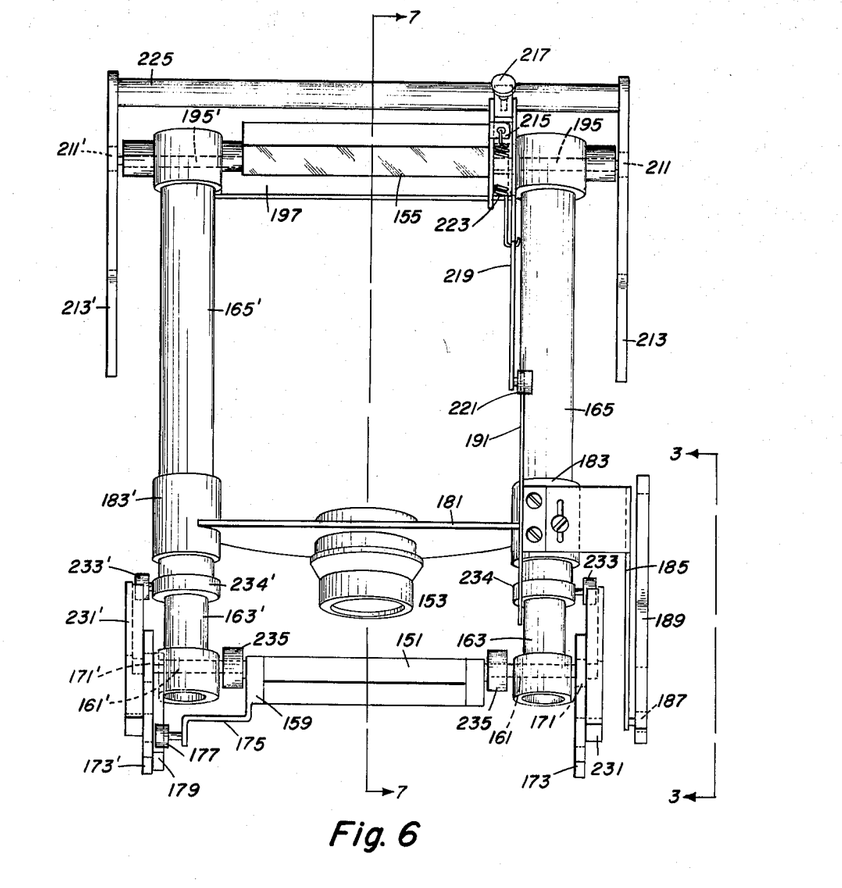
FIG. 6 is a top plan view of the optical system of FIG. 4, but showing the elements as they are positioned to provide the greatest reduction in the projected image size.
Figure 7:
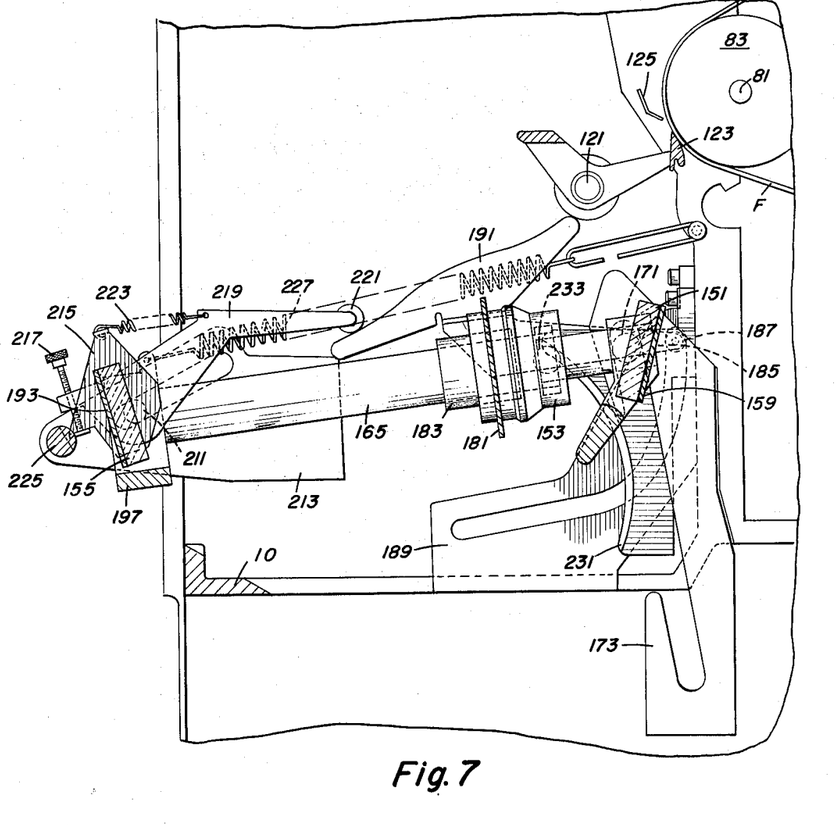
FIG. 7 is a sectional view of the optical system taken along lines 7—7 of FIG. 6.
Figure 8:
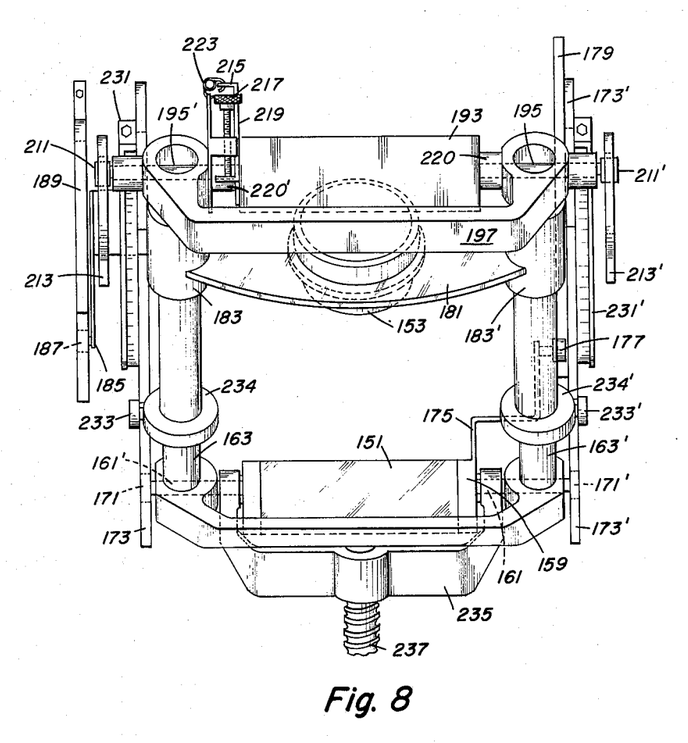
FIG. 8 is an elevation view taken in the direction indicated by the lines 8—8 of FIG. 4.

The numeral 171 and 171' designate follower rollers which are mounted for rotation on the ends of the shaft 161 and engage the focal length cams 173 and 173'. Cams 173 and 173' control the telescoping movement of the shafts 163 and 163' in shafts 165 and 165' as first mirror 151 is moved toward or away from the aperture P of the photographing station. The numeral 175 designates a bracket which is fixed relative to mirror support 159 and carries a follower roller 177 for engaging the first mirror cam 179. The function of mirror cam 179 is to rotate mirror 151 about the axis of shaft 161 so that the mirror is maintained in proper angular relation to the photographing station to reflect the image of an illuminated document therein through the projection lens 153 regardless of the position of the mirror as it moves up or down in the apparatus. Lens 153 is mounted for sliding movement along shafts 165 and 165' by means of the lens carriage 181 which supports lens 153 and the bushings 183 and 183'. Bushing 183 carries the magnification cam follower 185. The follower roller 187 on follower 185 engages in the cam slot of magnification cam 189. The effect of the magnification cam is to move lens 153 along the shaft 165 and 165' towards and away from mirror 151 as the mirror is moved up and down, respectively, in the apparatus. Bushing 183 also carries second mirror cam 191, the function of which will be hereinafter described. Second mirror 155 is mounted on mirror support 193 which is pivotally mounted by means of a shaft 195 to the upper shaft bracket 197 and the shafts 165 and 165'. Shaft 195 carries folower rollers 211 and 211' on the opposite ends thereof, to engage the slots provided in side plates 213 and 213'. Mirror adjusting bracket 215 is freely rotatable about shaft 195 and is attached to mirror support 193. Thus the angular position of mirror 155 can be adjusted by means of the vertical adjustment screw 217. The second mirror cam follower 219 is mounted for rotation about a hub 220 formed on the mirror support 193 and the follower roller 221 on follower 219 moves along the surface of cam 191 to thereby effect a rotation of second mirror 155 through the engagement of screw 217 in follower 219 with bracket 215 as the projection lens 153 changes its position relative to the second mirror. A spring 223, which is connected between follower 219 and mirror adjusting bracket 215, holds the mirror adjusting bracket in engagement with the vertical adjustment screw 217. The side plates 213 and 213' are mounted to the frame 10 of the apparatus and are connected by a supporting tie bar 225. The carriage return springs 227 only one of which is shown are connected between the frame 10 and the second mirror shaft bracket 197, thereby urging the mirror 155 and the lens carriage shafts 165 and 165' towards the drive roller 83. Two focal length adjustment cams 231 and 231' are also mounted in the apparatus to frame 10. The follower rollers 233 and 233' which are rotatably carried adjacent to the end of shafts 165 and 165' on rings 234 and 234' engage the cams 231 and 231' and thereby control the position of second mirror 155 relative to the side plates 213 and 213'.

Figure 5:
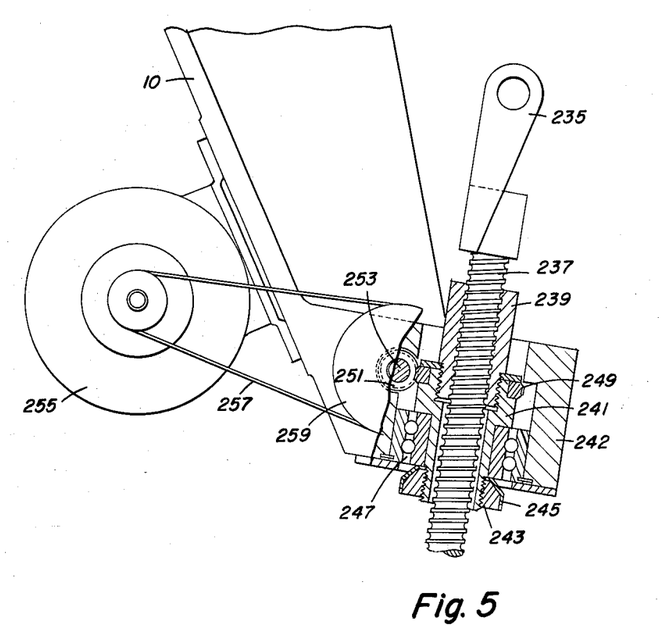
FIG. 5 is an enlarged view showing the drive mechanism for the optical system.

The mechanism for moving the elements of the optical system along the path which is determined by the various cams will now be described. A yoke 235 is pivotally carried by shaft 161 and is attached on the other end to a screw 237. Screw 237 is threaded in nut 239 which, in turn, is threaded onto a bushing 241, see FIG. 5. Bushing 241 is retained within the housing 242, a portion of frame 10, by means of nut 243 and lock washer 245. Bushing 241 is rotatably supported in the housing by a ball bearing 247. A worm gear 249 is fixed on the outer periphery of bushing 241 and this gear mates with worm 251 which is carried on a shaft 253 driven by electric motor 255 through a belt 257 and pulley 259. Thus it will be seen that rotation of the worm gear 249 by the motor 255 causes the screw 237 to be moved relative to nut 239, thereby raising or lowering the first mirror 151 and the other optical elements within the apparatus, depending upon the direction of rotation of the motor. The cam surfaces which control the position of the optical elements of the optical system described above are selected to maintain in focus the image of the document which is projected to the exposure station regardless of the magnification of such image which can be varied within predetermined limits thereby. The electric power to the motor 255 and the direction which that motor drives belt 257 is controlled by conventional electrical circuitry and switches, not shown, provided in a convenient location in the apparatus. The portion of the apparatus which is shown in FIG. 3 is enclosed within a suitable housing so that light from the environs cannot expose or fog the photosensitive film F as it is moved through the exposure station E.

In order to further facilitate the understanding of the invention, a description will now be provided of the movements of the optical elements of the optical system when the magnification thereof is increased. First, the switch in the electrical power circuit for motor 255 is closed so that motor 255 drives screw 237 in a direction which raises yoke 235 within the apparatus. The angular relation of mirror 151 to the photographing station is changed by the cams 179, i.e., mirror 151 is rotated in a clockwise direction, as viewed in FIG. 4, about the axis of shaft 161 as the mirror is raised toward the photographing station. The mirror 151 is moved relative to projection lens 153 as a result of telescoping movement of shafts 163 and 163' into shafts 165 and 165', respectively, caused by cam 173 and 173' acting on the mirror through rollers 171 and 171'. Lens 153 is moved along shafts 165 and 165' toward first mirror 151 through the action of magnification cam 189, roller 187, and follower 185. Second mirror 155 moves away from lens 153 as a result of rollers 233 and 233' engaging the focal length adjustment cams 231 and 231' which pushes rollers 211 and 211' down the slot in the slide plates 213 and 213'. Movement of mirror 155 relative to lens 153 causes the mirror to be rotated about the axis of shaft 195 as a result of the action of roller 221 moving along second mirror cam 191. The net effect of these movements, all of which occur substantially simultaneously and in synchronism, is to increase the size of the projected image in the photographing station while shortening the overall length of the projected image path while maintaining the projected image in focus in the exposure station E. The movements which occur during reducing the magnification of the system are a reversal of those just described and therefore such a further description thereof is not included herein.

In view of the foregoing description it will be readily apparent to one skilled in the art that we have disclosed an improved mechanism for controlling the advance of film so that an unexposed section thereof is positioned to receive the projected images of successive documents, that we have disclosed a novel mechanism for adjusting the size of the exposure aperture in the exposure station to conform to the extent of movement which is imparted to the film by the film advancing mechanism, and that an improved mechanism is disclosed for simplifying the changing of the optical magnification of the optical system in such a photographic copying apparatus.

The invention has been described in detail with particular reference to preferred embodiments thereof, but it will be understood that variations and modifications of the invention can be effected within the spirit and scope of the invention as described hereinabove and as defined in the appended claims.

Having now particularly described our invention what we desire to secure by Letters Patent of the United States and what we claim is:

1. A device for controlling the movement of media in an apparatus having media transport means, said device comprising:
   (1) a lever mounted for pivotal movement about a pivot axis and having an input portion and an output portion spaced from said axis, said pivot axis being located between said input and said output portions,
   (2) means for imparting a predetermined displacement to said input portion to pivot the lever about said axis,
   (3) means operatively connecting said output portion to said transport means so that the media is moved a distance proportional to the displacement of said output portion about said axis, and
   (4) means for varying the position of said axis relative to said input and output portions to vary the displacements of said output portion in response to said predetermined displacement of said input portion and thereby control the length of the media sections moved into said station.

2. A media feed control device for use in a document copying apparatus having a photographing station for receiving documents, an exposure station for receiving recording media, and means for moving the media in the exposure station in timed sequence to the movement of documents from the photographing station, said device comprising:
   (1) drive means disposed in said exposure station for driving engagement with said recording media,
   (2) a drive arm mounted for pivotal movement about a fixed axis for imparting driving movement to said drive means,
   (3) clutch means connecting said arm and said drive means for movement as a unit only during movement of the arm in one direction about said fixed axis,
   (4) a crank driven by said document feeding means,
   (5) a pawl arm connected on one end to said crank and pivotally mounted in said apparatus for movement about an axis which is parallel to said fixed axis and which is located between said one end and the other end of said pawl arm,
   (6) means operatively connecting said other end of said pawl arm and said drive arm so that the drive arm is driven by said pawl arm, and
   (7) means for selectively varying the location of the pawl arm axis with respect to the ends of the pawl arm to change the extent of movement imparted to said drive means and thereby to the media, by each movement of the pawl arm.

3. A device in accordance with claim 2 and wherein said fixed axis is horizontally disposed, said device further comprising means operating in synchronism with said varying means to maintain said ends of the pawl arm in the same relative verticle position to said fixed axis regardless of the position of said pawl arm axis.

4. A device in accordance with claim 2 and wherein:
   (1) said drive means comprises a roller which drives the recording media through frictional contact of the periphery of the roller with said recording media; and
   (2) said fixed axis corresponds to the rotational axis of said roller.

5. A media feed and mask control device for use in a document copying apparatus having a photographing station for receiving documents, means for feeding documents successively through said photographing station, an exposure station for receiving recording media for recording images of the documents in the photographing station and a mask having an exposure aperture for defining the exposure station and including means for varying the width of the exposure station, said device comprising:
(1) drive means disposed in said exposure station for driving engagement with said recording media,
(2) a drive arm operatively associated with said drive means and mounted for pivotal movement about a fixed axis in said apparatus for imparting driving movement to said drive means, said drive arm also being operatively connected to said varying means to control the size of the exposure aperture,
(3) clutch means connecting said arm and said drive means for movement as a unit only during movement of the arm in one direction about said fixed axis,
(4) a crank driven by said document feeding means,
(5) a pawl arm connected on one end to said crank and pivotally mounted in said apparatus for movement about an axis which is parallel to said fixed axis and which is located between said one end and the other end of said pawl arm,
(6) means operatively connecting said other end of said pawl arm and said drive arm so that the drive arm is driven by said pawl arm, and
(7) means for selectively varying the position of the pawl arm axis with respect to the ends of the pawl arm to change the extent of movement imparted to said drive means and to change the extent of movement imparted to said varying means, thereby controlling both the spacing between successive recorded documents on the recording media and the size of the area exposed to the document image on the recording media.

6. A media feed control device for use in document copying apparatus having a photographing station for receiving documents and including a document feeding means, an exposure station for receiving recording media, and means for moving the media in the exposure station in timed sequence to the movement of documents from the photographing station, said device comprising:
(1) a drive means disposed in said exposure station for driving engagement with said recording media,
(2) a drive arm mounted for pivotal movement about a fixed axis for imparting driving movement to said drive means,
(3) clutch means connecting said arm and said drive means for movement as a unit only during movement of the arm in one direction about said fixed axis,
(4) means connected to said document feeding means for imparting separate movements of different magnitude to said control device,
(5) a plurality of cranks contacting said movement imparting means so that each of said cranks receives a movement of different magnitude,
(6) a plurality of pawl arms respectively connected on one end to said cranks and pivotally mounted in said apparatus for movement about a single axis which is parallel to said fixed axis and which is located between said one end and the other end of said pawl arms,
(7) means operatively connecting said other ends of said pawl arms and said drive arms so that the drive arm is separately drivable by each of said pawl arms, and
(8) means for selectively varying the location of the said single pawl arm axis with respect to the ends of the pawl arms to change the extent of movement which can be imparted to said drive means and thereby to the media, by each movement of said pawl arms.

7. A device in accordance with claim 6 wherein said connecting means comprises a plurality of links respectively connected to each of said pawl arms, said links being each adapted for separate connection to said drive means.

8. A device in accordance with claim 6 wherein said connecting means are selectively operable to impart forces from any one of said plurality of pawl arms to said drive arm.

9. A device in accordance with claim 8 further comprising means for selecting one of said pawl arms for imparting movement through said connecting means to said drive means.

10. A device in accordance with claim 5 wherein said means for varying the exposure station width includes a mask comprising one fixed element and another movable element, said movable element being operatively connected to said drive means to adjust the area of light image received at the exposure station in proportion to the movement of said recording media.

References Cited by the Examiner

UNITED STATES PATENTS

| | | | |
|---|---|---|---|
| 1,732,704 | 10/1929 | Wegner | 226—123 |
| 2,256,396 | 9/1941 | Luboshez | 88—24 |
| 2,496,329 | 2/1950 | Briechle et al. | 95—31 |
| 2,528,840 | 11/1950 | Mitchell | 95—31 |
| 2,541,737 | 2/1951 | Bardsley et al. | 226—138 |
| 2,657,613 | 11/1953 | Maker et al. | 88—24 |
| 2,682,194 | 6/1954 | Rosenburgh | 88—24 |
| 2,845,841 | 8/1958 | Collins | 88—24 |
| 2,938,427 | 5/1960 | Alves | 88—24 |
| 2,968,992 | 1/1961 | Billet | 88—24 |
| 3,076,368 | 2/1963 | Groll | 226—139 X |
| 3,152,741 | 10/1964 | Jorgensen | 226—141 X |

NORTON ANSHER, *Primary Examiner.*

EMIL G. ANDERSON, R. A. WINTERCORN,
*Examiners.*